Dec. 2, 1952   G. A. LYON   2,619,816
COMBINATION DISH
Filed Oct. 12, 1948

Inventor
George Albert Lyon
by  Attys

Patented Dec. 2, 1952

2,619,816

UNITED STATES PATENT OFFICE 2,619,816

COMBINATION DISH

George Albert Lyon, Detroit, Mich.

Application October 12, 1948, Serial No. 54,163

1 Claim. (Cl. 65—59)

This invention relates to a combination dish structure and more particularly to a composite article of manufacture comprising a multiple of dishes adapted to be nested one within the other for joint use together and separable for independent usage.

An object of this invention is to provide an article of manufacture in the form of a plurality of superimposed nested dishes which may be used together to form a single covered vessel and which may be separately usable as dishes for different purposes.

Another object of this invention is to provide interengageable dishes which may be economically stamped from sheet material such, for example, as scrap central discs left over from the stamping of metal rings, and the like.

In accordance with the general features of this invention there is provided a composite article of manufacture comprising three separable dishes formed to be superimposed one above the other in nested relation and including a bottom dish having an upstanding annular curved rib, a bowl having a curved bottom formed to nestingly seat inside the rib so that it will be centered on the bottom dish for support thereby, the bowl also having a curled outer peripheral flange and a top dish formed to serve as a cover for the bowl and including a curved outer peripheral flange for nesting over and around the bowl flange; the dishes being readily separable for separate and independent usages as desired.

For illustration, the bottom dish of the foregoing composite article can be used as a cheese dish or the like; the bowl can be used as a salad bowl; and the top dish can be used as a cake pan or the like, All dishes are preferably made of sheet metal such, for example, as stainless steel, so as to be readily cleanable and highly sanitary.

Other objects and features of this invention will more fully appear from the following detail description taken in connection with the accompanying drawing which illustrates a single embodiment thereof and in which.

As shown on the drawings.

Figure 1:
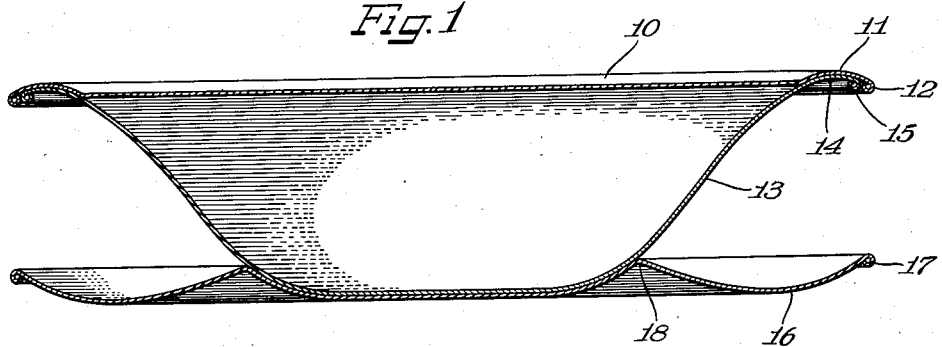
Figure 1 is a cross-sectional view through a composite dish of my invention.
Figure 2:
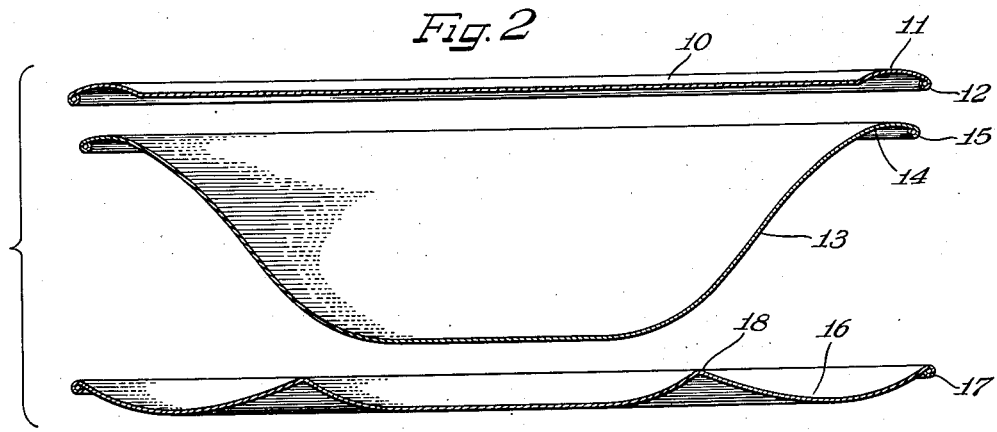
Figure 2 is a cross-sectional view similar to Figure 1 showing the component dishes separated, one from the other.
Figure 3:
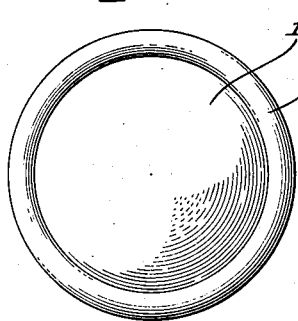
Figure 3 is a plan view of the top dish.
Figure 4:
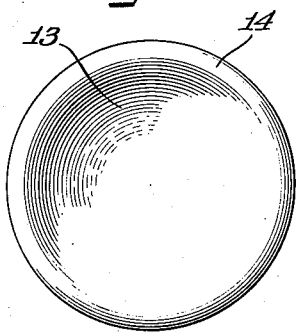
Figure 4 is a plan view of the bowl dish.
Figure 5:
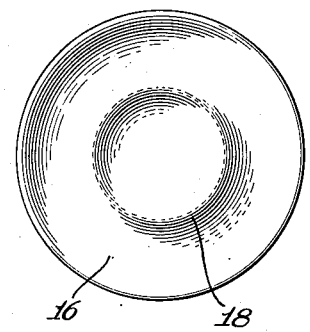
Figure 5 is a plan view of the bottom dish.

The reference character 10 designates generally the top dish which is in the form of a circular sheet metal stamping, which is also true of the other dishes to be described hereinafter, and includes an outer curved convex flange 11 terminating in a curled edge 12. This dish may be separately used as a cake pan and for many other household uses.

The reference character 10 designates the intermediate or bowl dish of the composite article. It includes a curved convex outer marginal flange 14 complemental to the marginal flange 11 of the dish 10 so that it can nest inside the same, as shown in Figure 1. Also the bowl has a turned or curled outer edge 15. This bowl dish can be separately used as a salad bowl, a fruit bowl, etc.

The bottom dish of the composite article which serves as the base of the same comprises a circular metallic dished stamping 16 having an annular upstanding rib 18 with a configuration complemental to that of the bottom of the bowl 13. This permits of the bowl 13 being seated inside the rib 18 for centering and supporting the bowl on the bottom dish. The bottom dish also includes a rolled or curved outer edge 17.

The bottom dish of the composite article may be used for numerous purposes such, for example, as a cheese or relish dish.

From the foregoing it is clear that the three dishes that go to make up the composite article each cooperates with the others in the composite product. The bottom dish serves as the support for the bowl and for the centering of the same. The top dish serves as a lid for the bowl. Whereas the bowl serves as the vessel for containing material between the other two dishes when interrelated in the manner above described. For illustration, the dishes when assembled together may be used as a dish for receiving hot contents, the lid serving to keep the heat in the bowl and the bottom to space the bowl above the table or other support on which the composite article is placed.

One of the desirable aspects of this invention is that each of the dishes is of a distinctly different configuration so that the three dishes may be used for different and independent purposes when not being used together.

I claim as my invention:

A composite dish including three separable elements to be superimposed one above the other and having portions in nested relation, said elements comprising a circular lower dish having an outer upwardly and outwardly flared peripheral portion and an intermediate upstanding annular rib surrounding a substantially flat center, a bowl having a bottom complementary to the inner side of said rib and to said center to nest inside said rib so that it will be centered on said dish for support thereby, said bowl having at the upper part of its side wall an annular peripheral outer flange of curved cross section with a continuous annular under-curled outer edge bead, and a cover for the bowl having an outer peripheral flange complementary to and nesting over and around said bowl flange, said cover having an outer continuous annular undercurled head depending about and engaging said bowl edge bead portion to retain the cover against transverse movement relative to said bowl, said bowl edge bead and said cover bowl bead coacting to protect each other and the contents of the bowl from injury, said elements being readily separable for separate and independent usages, said elements comprising circular sheet metal stampings.

GEORGE ALBERT LYON.

REFERENCES CITED

The following references are of record in the file of this patent:

UNITED STATES PATENTS

| Number | Name | Date |
|---|---|---|
| D. 106,437 | Guild | Oct. 12, 1937 |
| 118,995 | Wetjen | Sept. 12, 1871 |
| 491,702 | Felix | Feb. 14, 1893 |
| 1,181,162 | Pierce | May 2, 1916 |
| 1,509,524 | Morrison | Sept. 23, 1924 |
| 1,635,918 | Alaj | July 12, 1927 |
| 1,666,389 | Mander | Apr. 17, 1928 |
| 1,717,974 | Heinrichs | June 18, 1929 |
| 1,919,765 | Barnes | July 25, 1933 |
| 1,978,175 | Stalle | Oct. 23, 1934 |
| 2,342,486 | Poglein | Feb. 22, 1944 |